United States Patent
Yu

(10) Patent No.: US 8,964,108 B2
(45) Date of Patent: Feb. 24, 2015

(54) PHOTOGRAPHING AND ELECTRONIC APPARATUS USING SAME BASED ON LIGHT BLOCKING ANALYSIS

(71) Applicants: Fu Tai Hua Industry (Shenzhen) Co., Ltd., Shenzhen (CN); Hon Hai Precision Industry Co., Ltd., New Taipei (TW)

(72) Inventor: Qi-Long Yu, Shenzhen (CN)

(73) Assignees: Fu Tai Hua Industry (Shenzhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 6 days.

(21) Appl. No.: 13/870,984

(22) Filed: Apr. 26, 2013

(65) Prior Publication Data

US 2013/0286279 A1   Oct. 31, 2013

(30) Foreign Application Priority Data

Apr. 26, 2012   (CN) .......................... 2012 1 1256035

(51) Int. Cl.
*H04N 5/222*   (2006.01)
*H04N 5/235*   (2006.01)
*H04N 5/232*   (2006.01)

(52) U.S. Cl.
CPC ............. *H04N 5/2354* (2013.01); *H04N 5/232* (2013.01)
USPC ........................................ 348/370; 348/211.4

(58) Field of Classification Search
CPC ..... G06F 3/0304; G06F 3/017; G06F 3/0325; H04N 5/2256; H04N 5/232; H04N 13/0253
USPC ............ 348/148, 207.99, 211.99, 222.1, 294, 348/345–356, 361, 370, 371, 211.4; 382/104
See application file for complete search history.

(56) References Cited

U.S. PATENT DOCUMENTS

| | | | | |
|---|---|---|---|---|
| 2006/0256229 A1* | 11/2006 | Wernersson | .................. | 348/348 |
| 2008/0240507 A1* | 10/2008 | Niwa et al. | ..................... | 382/104 |
| 2010/0013943 A1* | 1/2010 | Thorn | ......................... | 348/222.1 |
| 2010/0073497 A1* | 3/2010 | Katsumata et al. | ...... | 348/211.99 |
| 2010/0194942 A1* | 8/2010 | Wada | ............................ | 348/294 |
| 2010/0238344 A1* | 9/2010 | Tsai | ............................... | 348/361 |
| 2012/0287276 A1* | 11/2012 | Dwivedi et al. | ............... | 348/148 |

* cited by examiner

*Primary Examiner* — Dennis Hogue
(74) *Attorney, Agent, or Firm* — Novak Druce Connolly Bove + Quigg LLP

(57) ABSTRACT

An electronic apparatus includes a lighting device, an imaging device, and a photographing system. The lighting device emits visible light. The imaging device views a subject. Prior to an image capture, the photographing system recognizes blocking of a bright light by a subject's hand or arm, where the bright spot of light and the photographing system controls the bright light to switch off and immediately capture an image.

17 Claims, 2 Drawing Sheets

PHOTOGRAPHING AND ELECTRONIC APPARATUS USING SAME BASED ON LIGHT BLOCKING ANALYSIS

TECHNICAL FIELD

The disclosure generally relates to photographing technologies, and particularly, to a system and method for photographing and an electronic apparatus using the photographing system.

DESCRIPTION OF RELATED ART

A photographing device can employ a self-timer to take a picture automatically. However, a user often fails to make a good preparation for being shot by the self-timer because an accurate shooting moment of the self-timer is difficult to predict and be ready for.

Therefore, it is desirable to provide a means, which can overcome the above-mentioned problems.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

In general, the word "module," as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable median include CDs, DVDs, BLU-RAY, flash memory, and hard disk drives.

Figure 1:
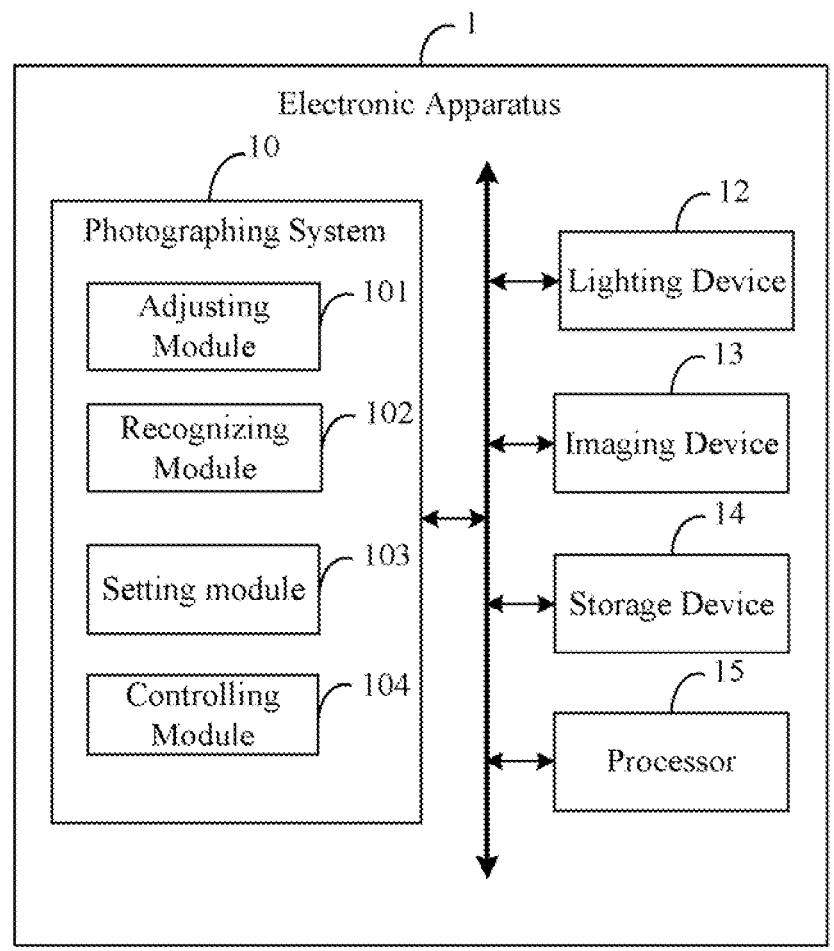
FIG. 1 is a block diagram of one embodiment of an electronic apparatus.

FIG. 1 is a block diagram of one embodiment of an electronic apparatus 1. The electronic apparatus 1 includes a lighting device 12, an imaging device 13, a storage device 14, a photographing system 10, and at least one processor 15. The lighting device 12, the imaging device 13, the storage device 14, and the at least one processor 15 are directly or indirectly electronically connected, for data exchange. In this embodiment, the electronic apparatus 1 may be, but is not limited to, a camera or a mobile intelligent terminal with a photographing function, such as a tablet computer or a cellular phone.

The imaging device 13 acquires an image of a subject being shot. The image can be a latent image formed on a negative film or represented by data from an image sensor. A number of photographing parameters of the imaging device 13, for example a focal length, an aperture value, a shutter speed, an exposure mode, and so forth, can be adjusted according to ambient light and a position of the subject. In this embodiment, the imaging device 13 is a camera module having a group of imaging lens and an imaging sensor.

The lighting device 12 emits light to control a shooting action of the imaging device 13. The light forms a bright spot of light on an obstacle when the light is blocked by the obstacle. In this embodiment, the lighting device 12 emits visible laser light.

The storage device 14 may be, but is not limited to, a hard disk, or a dedicated memory, such as an EPROM, HDD, or flash memory. The storage device 14 stores data as to the image acquired by the imaging device 13.

The photographing system 10 includes an adjusting module 101, a recognizing module 102, a setting module 103, and a controlling module 104. Computerized codes of the photographing system 10 can be embedded into an operating system of the electronic apparatus 1, or stored in the storage device 14 and executed by the processor 15.

The adjusting module 101 adjusts a direction of the light emitted from the lighting device 12 according to a position of the subject to make the light pass close to the subject, but not be blocked by the subject directly. The subject can move a part of his/her body, such as his/her hand, to block the light when the subject is ready to take a picture. Thus, a bright spot of light is formed on the subject where the light is blocked, to function as a control signal of a shooting action of the imaging device 13.

The recognizing module 102 recognizes a bright spot of light formed on an image of the subject and determines a number of different states of the bright spot of light. In detail, the recognizing module 102 analyzes the image of the subject acquired by the imaging device 13. When a brightness of a bright area in the image of the subject is greater than 1.5 times of an average brightness of ambient light and a radius of the area is less than a predetermined value, the recognizing module 102 recognizes the area of bright light as the bright spot of light formed on the subject and records time of the bright spot of light. When the bright spot of light lasts for one second or more, the bright spot of light is regarded as continuously shining. When the bright spot of light lasts for less than one second, the bright spot of light is regarded as flashing.

The setting module 103 sets a number of controlling rules corresponding to a number of different photographing functions in the storage device 14. The controlling rules are a number of correspondences between the different states of bright spot of light and the different photographing functions. For example, the bright spot of light shining continuously corresponds to a capture of an image of the subject. The bright spot of light flashing once within a predetermined time interval, such as two seconds, corresponds to a continuous capture function, and flashing twice within the predetermined time interval corresponds to a switching between ON and OFF of a flash lamp.

The controlling module 104 controls the imaging device 13 to capture an image according to the state of bright spot of light and the preset controlling rules. For example, when the bright spot of light lasts more than one second, the controlling module 104 generates an instruction to capture to the imaging device 13 and the lighting device 12, the lighting device 12 shuts off the visible light when the shooting instruction is received and the imaging device 13 executes the capture within two seconds after receiving the instruction to capture.

Figure 2:
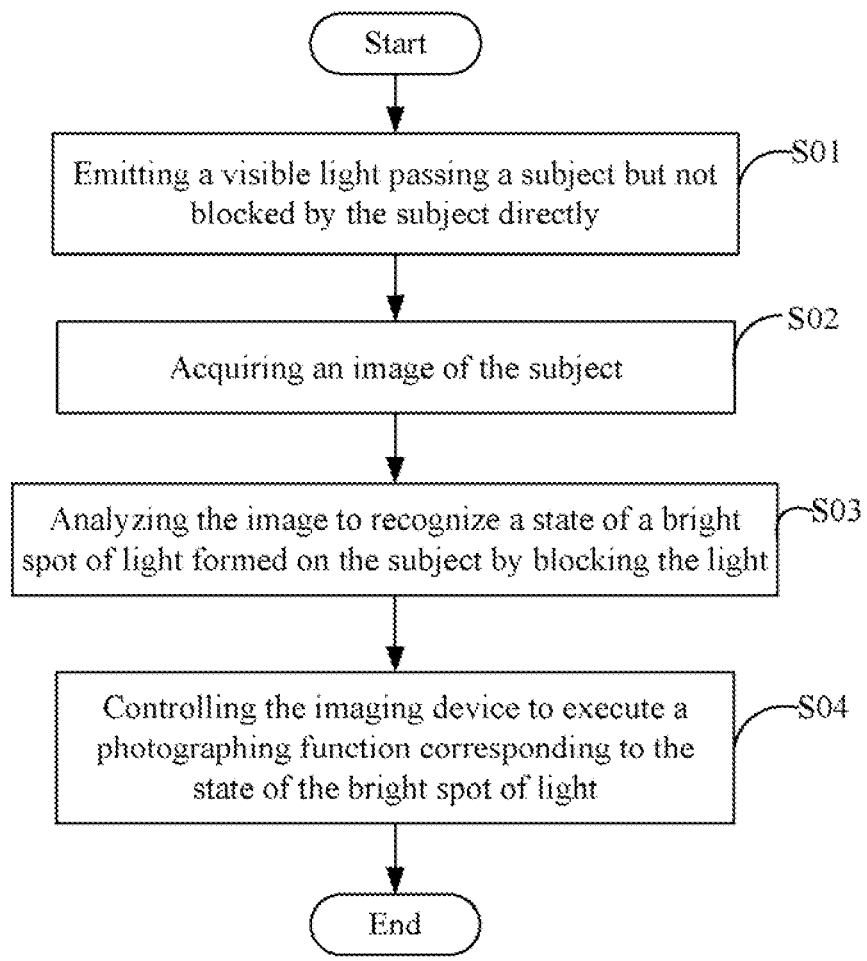
FIG. 2 is a flowchart of an exemplary embodiment of a photographing method.

FIG. 2 is a flowchart of an exemplary embodiment of a photographing method. Depending on the embodiment, additional steps may be added, others deleted, and the ordering of the steps may be changed.

In step S01, the lighting device 12 emits a visible light towards the subject. The adjusting module 101 adjusts the direction of the light emitted from the lighting device 12 to make the light closely pass the subject but not be blocked by the subject directly.

In step S02, the imaging device 13 acquires the image of the subject.

In step S03, the recognizing module 102 recognizes the states of the bright spot of light formed on the subject by blocking the light. The states of the bright spot of light include, but are not limited to, a continuous shining state and a flashing state. When time of the bright spot of light is equal to or more than one second, the recognizing module 102 recognizes the bright spot of light as continuous shining. When time of the bright spot of light is less than one second, the recognizing module 102 recognizes the bright spot of light as flashing.

In step S04, the controlling module 104 controls the imaging device 13 to execute the photographing function corresponding to the state of the bright spot of light according to the preset controlling rules. The controlling rules are a number of correspondences between the photographing functions and the states of the bright spot of light preset by the setting module 103. The correspondences between the photographing functions and the states of the bright spot of light include, but are not limited to, the continuous shining corresponding to a shooting action, the flashing once within two seconds corresponding to a continuous capture action, and the flashing twice within two seconds corresponding to a switching between ON and OFF states of the flash lamp.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic apparatus, comprising:
a lighting device that emits visible light;
an imaging device that acquires an image of a subject; and
a photographing system comprising:
an adjusting module that adjusts a direction of the visible light to make the light pass next to the subject;
a recognizing module that recognizes a bright spot of light formed when the subject blocks the visible light with a body part of the subject, and determines states of the bright spot of light by analyzing the image of the subject, the states of the bright spot of light determined by periods of time and frequencies of the blocking of the visible light by the subject; and
a controlling module that controls the imaging device to execute a different photographing function for each state of the bright spot of light,
wherein the recognizing module determines that the bright spot of light is continuous shining when the bright spot of light lasts more than one second, and determines that the bright spot of light is flashing when the bright spot of light lasts less than one second, and
wherein the states of the bright spot of light comprise at least a continuous shining state in which the bright spot of light lasts more than one second, a first flashing state in which the bright spot of light flashes once within a predetermined time interval, and a second flashing state in which the bright spot of light flashes twice within the predetermined time interval.

2. The electronic apparatus of claim 1, wherein the photographing system further comprises:
a setting module that presets a plurality of correspondences between the photographing functions and the states of the bright spot of light.

3. The electronic apparatus of claim 2, wherein the controlling module controls the imaging device to execute a capture when the bright spot of light is in the continuous shining state.

4. The electronic apparatus of claim 2, wherein the controlling module controls the imaging device to execute a continuous capture action when the bright spot light is in the first flashing state.

5. The electronic apparatus of claim 4, wherein the controlling module controls the imaging device to execute a switching between ON state and OFF state of a flash lamp when the bright spot of light is in the second flashing.

6. The electronic apparatus of claim 1, wherein the recognizing module recognizes the bright spot in the image of the subject when a bright area in the image is larger than 1.5 times of an average brightness of ambient light and a radius of the bright area is less than a predetermined value.

7. A photographing method being performed by execution of computer readable program code by a processor of an electronic apparatus, the method comprising:
adjusting a direction of visible light emitted by a lighting device of the electronic apparatus to make the visible light pass next to a subject;
acquiring an image of the subject with an image device of the electronic apparatus;
analyzing the image of the subject to recognize a bright spot of light formed when the subject blocks the visible light with a body part of the subject;
determining states of the bright spot of light by measuring periods of time and frequencies of the blocking of the visible light by the subject; and
executing a different photographing function of the imaging device for each state of the bright spot of light,
wherein the bright spot of light is determined to be continuous shining when the bright spot of light lasts more than one second, and the bright spot of light is determined to be flashing when the bright spot of light lasts less than one second, and
wherein the states of the bright spot of light comprises at least a continuous shining state in which the bright spot of light lasts more than one second, a first flashing state in which the bright spot of light flashes once within a predetermined time interval, and a second flashing state in which the bright spot of light flashes twice within the predetermined time interval.

8. The method as claimed in claim 7, wherein a capture action is executed when the bright spot of light is in the continuous shining state.

9. The method as claimed in claim 7, wherein a continuous capture action is executed when the bright spot of light is in the first flashing state.

10. The method as claimed in claim 7, wherein a switching action between ON state and OFF state of a flash lamp is executed when the bright spot of light is in the second flashing state.

11. The method as claimed in claim 7, wherein the bright spot of light is recognized when a bright area in the image is larger than 1.5 times of an average brightness of ambient light and a radius of the bright area is less than a predetermined value.

12. An electronic apparatus, comprising:
a lighting device that emits visible light;
an imaging device that acquires an image of a subject; and
a photographing system comprising:
an adjusting module that adjusts a direction of the visible light to make the visible light pass next to the subject;
a recognizing module that recognizes a bright spot of light formed when the subject blocks the visible light with a body part of the subject, and determines states of the bright spot of light by analyzing the image of the subject, the states of the bright spot of light determined by periods of time and frequencies of the blocking of the visible light by the subject; and
a controlling module that controls the imaging device to execute a different photographing function for each state of the bright spot of light.

13. The electronic apparatus of claim 12, wherein the photographing system further comprises:
a setting module that presets a plurality of correspondences between a plurality of photographing functions and a plurality of states of the bright spot of light.

14. The electronic apparatus of claim 13, wherein the states of the bright spot of light comprise a continuous shining state, the recognizing module determines the bright spot of light in the continuous shining state when the bright spot of light lasts more than one second, the controlling module controls the imaging device to execute a capture corresponding to the continuous shining state of the bright spot of light.

15. The electronic apparatus of claim 13, wherein the states of the bright spot of light comprise a flashing state, the recognizing module determines the bright spot of light in the flashing state when the bright spot of light lasts less than one second, the controlling module controls the imaging device to execute a continuous capture action when the bright spot of light flashes once within a predetermined time interval.

16. The electronic apparatus of claim 15, wherein the controlling module controls the imaging device to execute a switching between ON state and OFF state of a flash lamp when the bright spot of light flashes twice within the predetermined time interval.

17. The electronic apparatus of claim 12, wherein the recognizing module recognizes the bright spot in the image of the subject when a bright area in the image is larger than 1.5 times of an average brightness of ambient light and a radius of the bright area is less than a predetermined value.

* * * * *